United States Patent

Haug et al.

[11] Patent Number: 5,756,208
[45] Date of Patent: May 26, 1998

[54] FIBER COMPOSITE COMPRISING A CERAMIC MATRIX AND A PROCESS FOR PRODUCING IT

[75] Inventors: Tilman Haug, Uhldingen-Mühlhofen; Holger Gödeke, Achstetten; Peter Greil, Weisendorf; Daniel Suttor, Erlangen, all of Germany

[73] Assignee: Dornier GmbH, Friedrichshafen, Germany

[21] Appl. No.: 405,244

[22] Filed: Mar. 17, 1995

[30] Foreign Application Priority Data

Mar. 17, 1994 [DE] Germany ............... 44 09 099.4

[51] Int. Cl.$^6$ .................. C04B 35/80; C04B 35/58
[52] U.S. Cl. ............... 428/379; 428/357; 428/366; 428/698; 428/627; 156/89; 75/10.49; 427/530
[58] Field of Search ................. 428/408, 698, 428/699, 704, 357, 366, 379; 156/89; 75/10.49; 427/530

[56] References Cited

U.S. PATENT DOCUMENTS

| 5,130,278 | 7/1992 | Riccitiello et al. |
| 5,246,736 | 9/1993 | Goujard et al. |

FOREIGN PATENT DOCUMENTS

| 0 549 224 | 6/1993 | European Pat. Off. |
| 40 23 849 | 1/1992 | Germany |
| 41 13 728 | 11/1993 | Germany |

Primary Examiner—Richard Weisberger
Attorney, Agent, or Firm—Evenson, McKeown, Edwards & Lenahan, P.L.L.C.

[57] ABSTRACT

This invention relates to a high-strength ceramic fiber composite with a high temperature stability and an improved oxidation stability and to a process for producing it.

6 Claims, 2 Drawing Sheets

⊢⊣ 25 μm

⊢25μm

⊢250 μm

FIBER COMPOSITE COMPRISING A CERAMIC MATRIX AND A PROCESS FOR PRODUCING IT

BACKGROUND OF THE INVENTION

This invention relates to a high-strength ceramic fiber composite which has a high temperature stability and an improved oxidation stability and to a process for producing it.

The use of ceramic fiber composites, particularly comprising carbon fibers, requires an oxidation protection system in order to avoid early damage to the fibers and thus a downgrading of the mechanical characteristics in the case of oxidative environmental conditions and temperatures above 400° C. A production process is required which, while the variability of the shaping is as high as possible, avoids any damage to the fiber. The thermomechanical and physical compatibility between the fiber and the ceramic matrix must be ensured, in which case the interface between the fiber and the matrix significantly determines the mechanical characteristics of the composite. The development of a high-strength ceramic fiber composite which has high temperature stability as well as protection against oxidation have been connected with considerable technological problems. They were usually considered separately in that the mechanical characteristics of the fiber-matrix composite and the improved oxidation stability are to be ensured by an external single-layer or multi-layer system.

With the exception of carbon fibers, the currently available inorganic fibers, as a result of structural conversions, are limited in their application temperatures to maximally 1,200° C. For higher temperatures, so far only carbon fibers have been considered. The different routes for producing carbon fiber composites with a ceramic matrix comprise processes from conventional powder metallurgy techniques, in the case of which a preform is infiltrated with the ceramic material in the form of powders or suspensions which constitutes the matrix and is then compacted by means of hot-pressing methods. The main disadvantage of this process is the damage to the fiber during the hot pressing. Another process is the infiltration of preforms by way of CVI (Chemical Vapor Infiltration) techniques, in which case particularly C/Sic and C/C composites could be produced. This process has considerable disadvantages with respect to the long duration of the process. Both processes are limited with respect to the component size and the complexity.

While, for the purpose of improving the oxidation stability, glass layers on the basis of $SiO_2$, $B_2O_3$ and $P_2O_5$ were examined first, later CVD-deposited SiC and $Si_3N_4$ layers were in the foreground. Because of their wetting behavior and the partially high vapor pressures of individual constituents, pure glass layers presented problems depending on their composition; whereas, in the case of CVD-deposited layers, cracks will frequently form which will impair the long-term protection. Further development work from the field of manned space travel resulted in multi-layer systems with an interior SiC-layer and an exterior glass layer. An in-house research field is the internal oxidation protection of the C-fiber which is also constructed of complex multi-layer systems under the aspects of oxygen and carbon diffusion barriers.

Organo-metallic polymer precursors, such as polysiloxanes, which are distinguished by a high ceramic yield during the pyrolytic conversion into a ceramic phase, while utilizing the production process of the fiber reinforced synthetic materials, offer the possibility of producing a fiber composite having a ceramic matrix while maintaining the variable shaping.

The high shrinkage (approximately 30% linearly) connected with the polymer ceramic conversion leads to a high formation of porosity and cracks. The production of dense matrices therefore requires a multiple re-infiltration and repyrolysis. The application of a production technique which provides a multiple repetition of the infiltration and pyrolysis steps, in view of the significantly prolonged process times, is limited by economical aspects.

SUMMARY OF THE INVENTION

It is an object of the present invention to overcome the disadvantages connected with the above-described oxidation protection system and the production processes of matrices.

Damage to the fiber during the production process is avoided. A production process is provided which uses a hydrolysis-resistant and photo-oxidation-resistant precursor. The shrinkage occurring during the thermal conversion is eliminated and the occurrence of cracks is minimized in order to permit a green body processing which is close to the end contour. A high-strength fiber composite is created which has a high temperature stability and whose structure can be varied so that cracks can be minimized and internal tension can be reduced. The insufficient oxidation stability of previous systems is improved to such an extent that a temporary use at high temperatures is permitted also in an oxidizing atmosphere without any additional oxidation protection systems. The oxidation behavior is modified to such an extent that minor damages to external oxidation protection layers are compensated by the internal oxidation protection.

In its broadest aspect, the present invention resides in a high-strength fiber composite, comprising (A) a ceramic matrix having a single-phase or multi-phase amorphous, partially crystalline or crystalline structure which comprises (1) boron nitride, (2) boron carbide, (3) silicon carbide, oxycarbide or oxycarbonitride, or (4) mixtures thereof, and (B) a reinforcing fiber comprising carbon or an inorganic fiber.

In another aspect of the invention, the matrix comprises a mixture of an organo-metallic polymer precursor and a metallic powder or a metallic and ceramic powder which is thermally treated in an atmosphere of a protective gas or a N— or $N_2$— and C-containing reactive gas. The ceramic powder preferably comprises B and SiC. The fibers preferably comprise SiC, $Si_3N_4$, BN, $B_4C$, or carbon fibers (HT, HM, HM—HT, IM).

In a preferred embodiment, the fibers are coated with C, BN, β—$Al_2O_3$ or laminated silicates, whereby the adhesion between the fiber and the matrix is reduced in a targeted manner so that a high strength and damage tolerance is achieved with a fiber pull-out. In another preferred embodiment, the organo-metallic polymer precursors are polysiloxanes.

The process for producing the high-strength fiber composite comprises impregnating the reinforcing fiber with a solvent-containing mixture of the organo-metallic polymer precursor and a metallic powder or metallic and ceramic powder, compacting and cross-linking the thus impregnated fibers to form composite bodies, and converting the composite bodies at temperatures of up to 1,600° C. in a protective gas atmosphere to form a fiber composite with a ceramic matrix. At the preliminary stage of making the high-strength fiber composite with the ceramic matrix, a metallic ceramic filler is added in the form of a liquid or a solution to the organo-metallic polymer precursor, and the fiber is impregnated with this suspension. The impregnated fiber is then thermally converted at temperatures of up to 1,600° C. in a reactive gas atmosphere, whereby the metallic reactive filler reacts with the decomposition products of the organo-metallic polymer precursor and the reactive atmosphere to form a ceramic matrix which can be adjusted by controlling the temperature. The preferred reactive atmosphere is $NH_3$.

1. Process

The object of the invention is a high-strength, temporarily oxidation-resistant carbon fiber composite which is stable to high temperatures and has a ceramic matrix, as described above, which is obtained by impregnating the fiber with a Si-polymer/boron suspension or with a mixture of Si-polymer and a boron compound, and this is compacted and cross-linked to form a fiber reinforced polymer composite. This polymer composite is converted by means of a thermal conversion in a reactive $N_2$—atmosphere into a ceramic composite. In this case, the matrix is distinguished by an adjustable shrinkage (to 0%) and at the same time improves the oxidation protection effect for the fiber. By means of the thermochemical compatibility of the fiber and the matrix, damage to the fiber is avoided during the production.

2. Material

According to the process of the invention, the boron and/or the boron compound reacts at temperatures of up to 1,600° C. with the silicon-organic precursor and the $N_2$—atmosphere while forming low-oxygen, high-temperature stable ceramic reaction products which form the matrix as well as the surface cover layer of the fiber composite. In this case, a ceramic interface is formed in situ between the fiber and the matrix. By means of the compensation, which is caused by the polysiloxane boron nitrogen reaction, of the linear shrinkage (to 0%) in comparison to up to 30% in the filler-free polysiloxane, low-crack matrices and surface layers can be produced which have an increased oxygen diffusion resistance. The matrix of the fiber composite according to the invention is preferably a single-phase or multi-phase amorphous semi-crystalline or crystalline matrix made of boron nitride (BN), boron carbide ($B_4C$) and silicon carbide (SiC), oxycarbide and/or oxycarbonitride or of mixtures thereof. In an oxidative atmosphere, a sealing of the composite body surface takes place by the development of a borosilicate glass which acts as an internal as well as an external oxidation protection. Formed microcracks are closed by means of the glass sealing.

Because of the internal and external oxidation protection achieved according to the invention which is ensured by the ceramic matrix itself; because of the dimensional accuracy; because of the ceramic layer between the fiber and the matrix produced in situ; because of the resulting high mechanical stabilities and the integrity of the fiber ensured during the production of the fiber composite as well as because of the very variable shaping, the fiber composite, which can be produced according to the invention and has a ceramic matrix, is suitable for the application as a component for temperatures above 1,000° C. in air and space travel technology, in thermal engines, in traffic engineering as well as in power engineering.

BRIEF DESCRIPTION OF THE DRAWINGS

The following examples will explain the invention in detail in conjunction with the appended drawings wherein.

DESCRIPTION OF THE PREFERRED EMBODIMENTS

EXAMPLE 1

In a 2,000 ml. PE-bottle, 235 g. of a phenyl vinyl methyl hydrogen polysiloxane are dissolved in 240 mg. of a di- and trialkyl benzene mixture and 325 g. boron are added while the suspension is being stirred. The suspension is mixed with $Al_2O_3$ grinding balls and is homogenized on a roller bench. The carbon-coated C-fiber (Toray, T800 6k) is impregnated with the resulting slip and is unidirectionally deposited as a prepreg by means of a winding device. The dried prepregs are cut to size and are laminated in autoclave molds to form bidirectional composite bodies with a symmetrical layer construction. Compacting and cross-linking takes place in vacuum chambers in an autoclave.

This cross-linked composite body is thermally converted at 1,450° C. in the presence of nitrogen.

EXAMPLE 2

The process for producing cross-linked composite bodies described in Example 1 is repeated. However, a changed thermal converting process is used. The cross-linked composite body is thermally converted under flowing nitrogen at 1,150° C.

EXAMPLE 3

The process for producing ceramic fiber composite bodies described in Example 2 is repeated, with the only difference that a carbon-coated SiC-fiber (Nicalon, NL607) is used.

Figure 1:
FIG. 1 is a TEM-photograph of a fiber/matrix boundary region (interface) of Example 2.

In the case of the thermal conversion of the composites produced according to Examples 1 to 3, the filler reactions start at temperatures >800° C. while forming boron carbide. At the same time, a SiC boundary layer is formed in situ between the fiber and the matrix which improves the mechanical characteristics. Internal tensions can be reduced by means of the SiC fiber matrix boundary layer. The upper half of the TEM-photograph (FIG. 1) shows the C-fiber which is separated from the matrix by a homogeneous SiC boundary layer. The Si—(O)—C matrix contains carbon clusters which cause the dark coloring. The carbide formation of the filler leads to a carbon depletion of the matrix by the filler particle. Up to a pyrolysis temperature of 1,150° C., a partially amorphous high-strength, damage-tolerant composite is created which has a maximal application temperature of approximately 1,150° C. A rise of the pyrolysis temperature increases the crystallinity of the matrix, intensifies the nitriding and lowers the oxygen content. The crystallized system has a considerably increased application temperature (approximately 1,600° C.).

Figure 2:
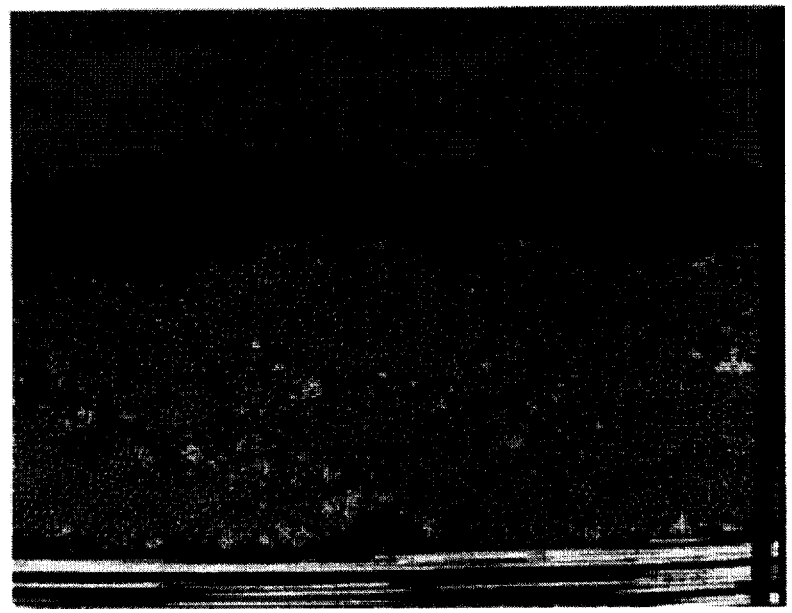
FIG. 2 is a photograph of the oxidation protection by means of the forming of a glass seal.

In an oxygen-containing atmosphere, the matrix material forms a glass seal starting at a temperature of approximately 600° C. in that the surface absorbs oxygen and forms a $B_2O_3$—glass. At temperatures ≦1,000° C., SiC forms $SiO_2$ on the surface. Boron oxide can vaporize from this borosilicate glass, and the surface is enriched with $SiO_2$ which represents an effective oxygen diffusion barrier also at high temperatures. In the oxygen-containing atmosphere, the thus formed borosilicate glass seal (FIG. 2) therefore prevents an early burning-off of the C-fibers at low temperatures (approximately 600°–1,000° C.) as well as at high temperatures (approximately 1,000–1,400° C.). With respect to the crystallized matrix, the partially amorphous system has an increased oxygen absorption.

The following table lists the material characteristics of Examples 1 to 3:

|  | Material Example 1 | Material Example 2 | Material Example 3 |
|---|---|---|---|
| Fiber Content (Vol %) | 44 | 42 | 38 |
| Tensile Strength (MPa) | 140 | 250 | 190 |
| Short Flexural Strength (MPa) | 4 | 6 | 4.5 |
| Max. Appl'n. Temp. | ca. 1600° C. | ca. 1150° C. | ca. 1150° C. |
| Oxidation Stability (1, 400° C., 1 h) $\Delta m_{ox}[mg/cm^2]$ | −3.07 | 1.0 | 11 |
| Density [g/cm$^3$] | 2.04 | 2.1 | 2.44 |
| Lin. Shrinkage [%] | 0 | 2 | 2 |
| Ceramic Yield [%] | 100 | 93 | 93 |

Figure 3:
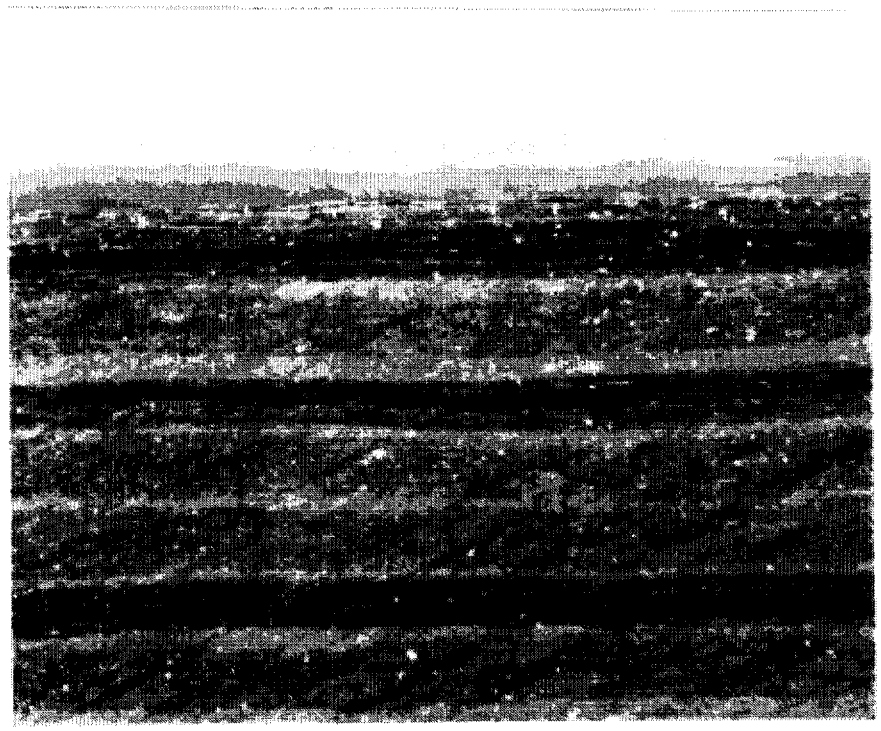
FIG. 3 is a photograph of a structure of a C-fiber reinforced composite of Example 1.

The structure (Example 1) illustrated in FIG. 3 exhibits the high density and homogeneity of the composite body. This is achieved by the filler reactions which result in an almost zero-shrinkage and cause a ceramic yield of approximately 100% of the green body cross-linked in the autoclave.

What is claimed is:

1. A high-strength fiber composite, comprising:

(A) a ceramic matrix having a single-phase or multi-phase amorphous, partially crystalline or crystalline structure comprising:
     (1) boron nitride,
     (2) boron carbide,
     (3) silicon carbide, oxycarbide or oxycarbonitride, or
     (4) mixtures thereof, and
  (B) a reinforcing fiber comprising carbon or an inorganic fiber.

2. A high-strength fiber composite according to claim 1, wherein the matrix is formed by thermally treating a mixture of a silicon polymer and a boron compound or a metallic and ceramic powder in an atmosphere selected from the group consisting of an inert gas, a reactive atmosphere of a compound containing nitrogen, a reactive $N_2$ atmosphere and a reactive $N_2$ and C-containing atmosphere.

3. A high-strength fiber composite according to claim 2, wherein said ceramic powder comprises B and SiC.

4. A high-strength fiber composite according to claim 1, wherein said fibers comprise SiC, $Si_3N_4$, BN, $B_4C$, or carbon fibers (HT, HM, HM—HT, IM).

5. A high-strength fiber composite according to claim 1, further comprising a fiber coating of C, BN, β—$Al_2O_3$ or laminated silicates, whereby the adhesion between the fiber and the matrix is reduced in a targeted manner so that a high strength and damage tolerance is achieved with a fiber pull-out.

6. High-strength fiber composite according to claim 2, wherein the silicon organo-metallic polymer procursors are polysiloxanes.

* * * * *